United States Patent
Schütz et al.

(10) Patent No.: US 12,365,121 B2
(45) Date of Patent: Jul. 22, 2025

(54) DEVICE AND METHOD FOR PROCESSING A PARTICLE FOAM MATERIAL TO PRODUCE A PARTICLE FOAM MOULDING

(71) Applicant: Siegfried Hofmann GmbH, Lichtenfels (DE)

(72) Inventors: Johannes Schütz, Bamberg (DE); Michael Deuerling, Steinwiesen (DE); Stefan Mahr, Hochstadt (DE); Patrick Fischer, Ebersdorf (DE); Peter Körber, Kulmbach (DE); Kai Faulhaber, Bad Staffelstein (DE); Edin Pachadjioski, Lichtenfels (DE)

(73) Assignee: Siegfried Hofmann GmbH, Lichtenfels (DE)

( * ) Notice: Subject to any disclaimer, the term of this patent is extended or adjusted under 35 U.S.C. 154(b) by 0 days.

(21) Appl. No.: 17/762,172

(22) PCT Filed: Sep. 10, 2020

(86) PCT No.: PCT/EP2020/075382
§ 371 (c)(1),
(2) Date: Mar. 21, 2022

(87) PCT Pub. No.: WO2021/063648
PCT Pub. Date: Apr. 8, 2021

(65) Prior Publication Data
US 2022/0371236 A1    Nov. 24, 2022

(30) Foreign Application Priority Data
Oct. 2, 2019   (DE) ..................... 10 2019 126 695.5

(51) Int. Cl.
*B29C 44/58* (2006.01)
*B29C 43/36* (2006.01)
(Continued)

(52) U.S. Cl.
CPC ............ *B29C 44/58* (2013.01); *B29C 43/361* (2013.01); *B29C 44/3426* (2013.01);
(Continued)

(58) Field of Classification Search
None
See application file for complete search history.

(56) References Cited

U.S. PATENT DOCUMENTS 4,272,469 A * 6/1981 Smith ................. B29C 44/3461
                                                    264/53
4,456,443 A * 6/1984 Rabotski ................. B29C 44/58
                                                    425/149
(Continued)

FOREIGN PATENT DOCUMENTS

DE      2810007 A1    9/1979
DE     10232632 A1    2/2003
(Continued)

OTHER PUBLICATIONS

International Search Report dated Dec. 4, 2020, pertaining to Int'l Patent Application No. PCT/EP2020/075382.
(Continued)

*Primary Examiner* — Benjamin A Schiffman
(74) *Attorney, Agent, or Firm* — Dinsmore & Shohl LLP

(57) ABSTRACT

A device for processing a particle foam material for producing a particle foam moulded part, comprising: at least one die apparatus, comprising a first die element and at least one additional die element, wherein the first die element is mounted so as to be movable along a movement axis relative to the at least one additional die element and/or the at least one additional die element is mounted so as to be movable along the or at least one movement axis relative to the first die element; at least one drive apparatus which is or can be assigned to the at least one die apparatus and is configured
(Continued)

for generating and/or transmitting a drive force that sets the first die element and/or the at least one additional die element into a movement along the movement axis, wherein the least one drive apparatus is designed as or comprises a linear-drive apparatus.

15 Claims, 4 Drawing Sheets

(51) Int. Cl.
  *B29C 44/34* (2006.01)
  *B29C 44/44* (2006.01)
  *B29C 44/60* (2006.01)
  B29C 33/20 (2006.01)
  B29C 33/22 (2006.01)
  B29C 43/58 (2006.01)
  B29K 105/04 (2006.01)

(52) U.S. Cl.
  CPC ............ *B29C 44/35* (2013.01); *B29C 44/445* (2013.01); *B29C 44/60* (2013.01); *B29C 33/202* (2013.01); *B29C 33/22* (2013.01); *B29C 2043/5833* (2013.01); *B29K 2105/048* (2013.01)

(56) References Cited

U.S. PATENT DOCUMENTS

| | | | |
|---|---|---|---|
| 4,557,881 A | 12/1985 | Rabotski | |
| 4,696,632 A * | 9/1987 | Inaba | B29C 45/66 425/451.2 |
| 4,781,568 A * | 11/1988 | Inaba | B29C 45/66 425/451.7 |
| 4,797,086 A * | 1/1989 | Adachi | B29C 45/66 425/589 |
| 4,874,309 A * | 10/1989 | Kushibe | B29C 45/6728 425/589 |
| 4,929,165 A * | 5/1990 | Inaba | B29C 45/66 425/451.2 |
| 4,968,239 A * | 11/1990 | Inaba | B29C 45/66 425/451.2 |
| 5,110,283 A * | 5/1992 | Bluml | B29C 45/66 425/451.7 |
| 5,811,139 A | 9/1998 | Hehl | |
| 6,179,607 B1 * | 1/2001 | Inaba | B29C 45/66 425/451.7 |
| 6,478,571 B1 * | 11/2002 | Tsai | B29C 45/661 425/593 |
| 6,554,606 B1 * | 4/2003 | Koide | B29C 45/66 425/451.7 |
| 6,821,463 B2 * | 11/2004 | Di Dio | B29C 45/68 264/40.5 |
| 6,990,896 B2 * | 1/2006 | White | B30B 1/18 425/150 |
| 7,156,652 B2 * | 1/2007 | Hazama | B29C 45/66 425/589 |
| 7,449,139 B2 * | 11/2008 | Kestle | B29C 45/68 164/343 |
| 10,525,623 B2 * | 1/2020 | Takahashi | B22D 17/263 |
| 2011/0268924 A1 | 11/2011 | Dickens | |

FOREIGN PATENT DOCUMENTS

| | | |
|---|---|---|
| DE | 202004010050 U1 | 10/2004 |
| DE | 102009028987 A1 | 4/2011 |
| DE | 102015112149 A1 | 1/2017 |
| JP | H0679732 A | 3/1994 |
| WO | 1990000467 A1 | 1/1990 |
| WO | 2011058071 A2 | 5/2011 |
| WO | 2021063648 A1 | 4/2021 |

OTHER PUBLICATIONS

Chinese Office Action dated Mar. 14, 2024, pertaining to CN Patent Application No. 202080069998.4, 24 pgs.

* cited by examiner

DEVICE AND METHOD FOR PROCESSING A PARTICLE FOAM MATERIAL TO PRODUCE A PARTICLE FOAM MOULDING

CROSS REFERENCE TO RELATED APPLICATIONS

The present specification is a National Phase Entry of International Application No. PCT/EP2020/075382 filed Sep. 10, 2020 and entitled "Device for processing a particle foam material to produce a particle foam moulding" which itself claims the benefit of German Patent Application No. DE 10 2019 126 695.5 filed Oct. 2, 2019, the entirety of each of which is incorporated by reference herein.

FIELD

The present specification relates to a device for processing a particle foam material for producing a particle foam moulded part, comprising a die apparatus, comprising a first die element and at least one additional die element, wherein the first die element is mounted so as to be movable along a movement axis relative to the at least one additional die element and/or the at least one additional die element is mounted so as to be movable along the or at least one movement axis relative to the first die element, as well as a drive apparatus which is or can be assigned to the at least one die apparatus and is configured for generating and/or transmitting a drive force that sets the first die element and/or the at least one additional die element into a movement along the movement axis.

Corresponding devices, routinely also referred to as moulding machines, for processing a particle foam material for producing a particle foam moulded part are known in principle from the prior art and typically comprise a die apparatus comprising a plurality of die elements, wherein at least one die element is mounted so as to be movable along a movement axis relative to at least one additional die element in order to produce an open position and a closed position of the die apparatus, and a drive apparatus which is configured for generating and/or transmitting a drive force that sets the movably mounted die element into a movement along the movement axis.

In drive apparatuses of known devices, there is often the problem of an asymmetrically acting drive force, which can result in a non-parallel orientation of the die elements and thus imprecise closure of the die apparatus in the closed position. Furthermore, the drive apparatuses of known devices sometimes exhibit insufficient tolerances in the positioning of the die elements in the closed position.

Proceeding therefrom, the problem addressed by the present specification is to provide a device for processing a particle foam material for producing a particle foam moulded part that is improved compared with the above.

SUMMARY

The problem is solved by a device according to claim 1. The claims that are dependent thereon relate to possible embodiments of the device according to claim 1.

A first aspect of the present specification relates to a device for processing a particle foam material for producing a particle foam moulded part. The device can also be referred to as or considered to be a moulding machine.

The device is generally designed for processing a particle foam material for producing a particle foam moulded part. The device is therefore designed for carrying out at least one working process for processing a particle foam material for producing a particle foam moulded part. A corresponding working process that can be carried out by means of the device may e.g. be an expansion or connection process of a particle foam material for producing a particle foam moulded part.

A particle foam material that can be or is to be processed by means of the device may typically be an expandable or expanded plastics particle material. The particle foam material may e.g. be formed by expandable or expanded plastics particles or may comprise expandable or expanded plastics particles. In this context, purely by way of example, reference is made to expanded and/or expandable polypropylene (PP or EPP), expanded and/or expandable polystyrene (PS or EPS) and expanded and/or expandable thermoplastic elastomer (TPE). Mixtures of expandable or expanded particle materials or particles that differ in at least one chemical and/or physical parameter are conceivable; the term "particle foam material" can therefore also cover mixtures of expandable or expanded particle materials or particles that differ in at least one chemical and/or physical parameter.

In the operation of the device, typically at least one working medium is used. A working medium is generally an, in particular liquid, vaporous or gaseous, energy-carrier medium, such as a liquid, i.e. in particular water, steam, i.e. in particular superheated steam, or a gas, which, in the operation of the device, absorbs or outputs energy, i.e. in particular thermal energy, kinematic energy, etc., or is designed to do this.

The device comprises at least one die apparatus and at least one drive apparatus that is or can be assigned to the at least one die apparatus. In the following, a die apparatus and a drive apparatus are discussed in most cases, but this does not exclude the device from comprising a plurality of die apparatuses and/or drive apparatuses.

The die apparatus comprises a first die element and at least one additional die element. The first die element is mounted so as to be movable relative to the at least one additional die element along a movement axis defining a movement path, which axis is in particular a translational axis, as is clear in the following. Alternatively or additionally, the at least one additional die element is mounted so as to be movable relative to the first die element along the or at least one movement axis, which is in particular a translational axis, as is clear in the following. The die apparatus therefore comprises a plurality of die elements, wherein at least one die element is mounted so as to be movable relative to at least one additional die element along a movement axis.

The at least one movably mounted die element is mounted so as to be movable between at least one first position and at least one additional position. The at least one first position may be correlated with at least one open position of the die apparatus, and the at least one additional position may be correlated with at least one closed position of the die apparatus, or vice versa. In the at least one open position of the die apparatus, it is possible to access the moulding cavity of the die apparatus. In the at least one closed position, it is not possible to access the moulding cavity of the die apparatus. By moving the movably mounted die element relative to the at least one additional die element, at least one open position and at least one closed position of the die apparatus can therefore be produced. The die apparatus can therefore be transferred into at least one open position and at least one closed position by moving the movably mounted die element.

It is clear from the above information that the at least one movably mounted die element and thus also the die apparatus can be moved into a plurality of open positions. Respective open positions differ in their respective degrees of opening. It is also clear from the above information that the at least one movably mounted die element and thus also the die apparatus can be moved into a plurality of closed positions. Respective closed positions differ in their respective degrees of closure.

It is applicable to the exemplary embodiment in which the at least one movably mounted die element can be moved into a plurality of closed positions that a first closed position brings about a first degree of closure of the die apparatus and a second closed position brings about a second degree of closure of the die apparatus that is different from, i.e. in particular greater than, the first degree of closure. The movement of the movably mounted die element from the first closed position into the second closed position may be an embossing stroke movement, or an embossing stroke for short. In the second closed position, an embossing force can therefore be exerted on a particle foam material positioned in the moulding cavity of the die apparatus. By moving the movably mounted die element from the first closed position into the second closed position, an embossing process can therefore be implemented in which an embossing force can be exerted on a particle foam material positioned in the moulding cavity of the die apparatus. The second closed position can therefore be referred to as or considered to be an embossing position.

As is clear from the following, in an exemplary configuration, the die apparatus may comprise a movably mounted die element and a non-movably mounted die element. The movably mounted die element is mounted so as to be movable relative to the additional die element between a first and a second position. The at least one first position may, as mentioned, be correlated with at least one open position of the die apparatus, and the at least one additional or second position may, as mentioned, be correlated with at least one closed position of the die apparatus.

In all the embodiments, a die element may be designed as a die part delimiting a moulding cavity of the die apparatus, in particular a die half delimiting a moulding cavity of the die apparatus. Alternatively or additionally, a die element may be designed as a die carrier element, which is designed to carry a die part delimiting a moulding cavity of the die apparatus.

The drive apparatus that is or can be assigned to the die apparatus is configured for generating and/or transmitting a drive force that sets the relevant movable die element or the respective movable die elements into a movement along the movement axis. As is clear from the following, the drive apparatus may comprise a plurality of interacting parts for generating and/or transmitting a drive force that sets the relevant movable die element or the respective movable die elements into a movement along the movement axis.

The drive apparatus may e.g. comprise at least one drive unit for generating the drive force and/or at least one force-transmission unit for transmitting a drive force to the relevant movably mounted die element. A corresponding drive unit may e.g. be designed as a drive motor, in particular an electric drive motor, or may comprise at least one such motor. A corresponding force-transmission unit may e.g. be designed as or comprise a force-transmission means, in particular force-transmission belts, chains, etc.

In all the embodiments, the term "drive force" used herein also covers a "drive torque"; the term "drive force" can therefore be equated with a "drive torque".

The drive apparatus is designed as a linear-drive apparatus or may comprise at least one such apparatus. The movement axis along which the relevant movably mounted die element can be moved is, as mentioned, therefore a linear or translational axis. Movements of the relevant movably mounted die element along the movement axis are therefore linear or translational movements.

Designing the drive apparatus as a linear-drive apparatus makes it possible to move and position the relevant movably mounted die element in a precise manner into respective first and second positions or between respective first and second positions. Designing the drive apparatus as a linear-drive apparatus also allows for (largely) symmetrical force transmission to the relevant movably mounted die element. Designing the drive apparatus as a linear-drive apparatus thus results in a multitude of advantages with regard to moving and positioning the relevant movably mounted die element and thus also with regard to transferring the die apparatus into the open position and/or into the at least one closed position.

It is applicable in particular to the described exemplary embodiment, in which the die apparatus can be transferred into a plurality of closed positions, wherein the closed position can be referred to as or considered to be an embossing position, that designing the drive apparatus as a linear-drive apparatus also ensures that the die elements are in parallel, even in corresponding embossing processes in which there may sometimes be an uneven, i.e. in particular off-centre, load distribution.

Overall, an improved device for processing a particle foam material for producing a particle foam moulded part is therefore provided.

The linear-drive apparatus may comprise at least one first linear-drive element and at least one second linear-drive element interacting therewith, in particular by means of mechanical engagement, which, as is clear from the following, is in particular threaded engagement here. The first linear-drive element is typically mounted so as to be movable along the movement axis. The second linear-drive element is typically mounted so as not to be movable along the movement axis. The second linear-drive element may be configured for generating a drive force that sets the first linear-drive element into a movement along the movement axis and/or for transmitting a drive force that sets the first linear-drive element into a movement along the movement axis to the first linear-drive element.

The first linear-drive element may be designed as a first threaded element, i.e. in particular a threaded spindle, or may comprise at least one such element or spindle. The second linear-drive element may be designed as a second threaded element that is in mechanical engagement with the first threaded element, i.e. in particular as a nut that is in mechanical engagement (threaded engagement) with the threaded spindle, or may comprise at least one such element or nut. The linear-drive apparatus may therefore be designed as a threaded mechanism or screw mechanism comprising a first threaded element, i.e. in particular a threaded spindle, and a second threaded element, i.e. in particular a nut, or may comprise at least one such mechanism.

The first threaded element, i.e. typically the threaded spindle, is typically translationally movable along the movement axis, but is typically not rotatably mounted. The second threaded element, i.e. typically the nut, is typically rotatably movable about a rotational axis, i.e. in particular about the movement axis or an axis of symmetry or a central axis of the second threaded element, but is typically not translationally movably mounted. A relevant linear-drive apparatus designed as a threaded mechanism or screw mechanism is therefore typically configured to have a translationally movable, but not rotationally movable, first threaded element, i.e. typically a threaded spindle, and a rotationally movable, but not translationally movable, second threaded element, i.e. typically a nut.

The linear-drive apparatus may comprise at least one linear-drive unit that is or can be assigned to the first linear-drive element and/or at least one linear-drive unit that is or can be assigned to the second linear-drive element. A respective linear-drive unit may be configured for generating a drive force that sets the first linear-drive element into a movement along the movement axis. A respective linear-drive unit is a possible embodiment of an above-described drive unit of the drive apparatus. A relevant linear-drive unit may therefore e.g. be designed as a linear-drive motor, in particular an electric linear-drive motor, or may comprise at least one such motor.

In principle, a plurality of linear-drive apparatuses may be assignable or assigned to a linear-drive unit. A linear-drive unit may therefore be configured for generating a drive force that sets a first linear-drive element of a first linear-drive apparatus into a movement along the movement axis and for generating a drive force that sets at least one additional first linear-drive element of at least one additional linear-drive apparatus into a movement along the movement axis. In this way, a synchronous movement of a plurality of first linear-drive elements along the movement axis can be produced and/or ensured.

With regard to the above-described embodiment of the linear-drive apparatus as a threaded mechanism or screw mechanism that comprises a first threaded element and a second threaded element and has a translationally movable, but not rotationally movable, first threaded element and a rotationally movable, but not translationally movable, second threaded element, it is applicable that the linear-drive unit is in particular configured for generating a drive force that sets the second threaded element into a rotational movement. The second threaded element set into a rotational movement sets the first threaded element, which is in mechanical engagement therewith, which, as mentioned, is in particular threaded engagement, into a translational movement along the movement axis.

The first linear-drive element may be coupled, in particular coupled for movement, to a relevant movably mounted die element. Movements of the (as mentioned) movably mounted first linear-drive element may therefore be correlated with movements of the relevant movably mounted die element owing to the coupling or movement coupling to the relevant movably mounted die element. The first linear-drive element may be directly or indirectly coupled or coupled for movement to the relevant movably mounted die element. Therefore, movements of the first linear-drive element can be directly or indirectly transmitted to the relevant movably mounted die element. The coupling or movement coupling between the first linear-drive element and the relevant movably mounted die element may be produced by the first linear-drive element being directly or indirectly fastened to the relevant movably mounted die element; the first linear-drive element may therefore be directly or indirectly fastened to the relevant movably mounted die element. The first linear-drive element can be fastened to the relevant movably mounted die element by means of form-fitting and/or force-locked and/or material-bonded types of fastening, i.e. by means of clamped fastenings, tensioned fastenings, screwed fastenings or welded fastenings, for example. The first linear-drive element can be fastened to the relevant movably mounted die element so as to be detachable (without being damaged or destroyed).

A die element may comprise at least one, in particular bore-like or bore-shaped, or slot-like or slot-shaped, opening, which can be penetrated by a linear-drive element, i.e. in particular by a first linear-drive element. In particular, a non-movably mounted die element may comprise at least one opening, which is or can be penetrated by a linear-drive element, i.e. in particular by a corresponding first linear-drive element. A corresponding opening is typically dimensioned such that there is a certain distance between the walls of the relevant die element delimiting said opening and a linear-drive element penetrating said opening, such that the linear-drive element penetrating the opening does not come into contact with the walls of the relevant die element delimiting the opening. In other words, a corresponding opening typically has a certain oversize compared with a linear-drive element penetrating said opening, such that the linear-drive element penetrating the opening is mounted so as to be movable relative to the die element comprising the opening. A corresponding opening in a die element can be referred to as or considered to be a through-opening for a corresponding linear-drive element. In principle, however, it is equally conceivable for at least one threaded bearing, which is in particular in mechanical engagement with the linear-drive element penetrating the opening, to be arranged or formed in the opening. The threaded bearing may be received in the opening so as to be rotatable relative to the relevant die element.

As mentioned, in an exemplary configuration, the die apparatus may comprise a movably mounted first die element and a non-movably mounted additional die element. In this configuration of the die apparatus, the non-movably mounted die element may comprise at least one corresponding opening. In general, the die apparatus may therefore comprise a first die element and an additional or second die element, wherein the first die element is mounted so as to be movable relative to the additional or second die element. Here, the additional die element may be mounted so not to be movable, therefore to be stationary. Here, the additional die element may comprise at least one opening, which is or can be penetrated by at least one first linear-drive element. The first linear-drive element, which is coupled, in particular coupled for movement, to the movably mounted first die element, may penetrate the at least one opening in the additional or second die element.

The device may comprise at least one guide apparatus, which is or can be assigned to the at least one linear-drive apparatus and is configured for guiding, along the movement axis, at least one linear-drive element, which is mounted so as to be movable along the movement axis, during a movement along the movement axis. Movements of the linear-drive element mounted so as to be movable along the movement axis may therefore be guided movements. In this way, precise movement and positioning of the relevant movably mounted die element into respective first and second positions or between respective first and second positions can be ensured. Since the at least one additional or second position, as mentioned, is typically correlated with at least one closed position of the die apparatus, precise positioning of the die elements in at least one closed position of the die apparatus can therefore also be ensured, and this has a positive effect on the process reliability and quality of the process that can be carried out by the device for processing a particle foam material for producing a particle foam moulded part.

A corresponding guide apparatus may be designed as a linear guide or may comprise at least one such guide. A corresponding linear guide may comprise a first linear-guide element and at least one additional linear-guide element. The first linear-guide element interacts with the at least one additional linear-guide element to form a linear guide of the movably mounted linear-drive element along the movement axis. The first linear-guide element may define a guide axis that coincides with the movement axis or is arranged or oriented in parallel therewith. Specifically, the first linear-guide element may be designed as a guide rail or guide rod, for example. The at least one additional linear-guide element interacting with the first linear-guide element, this in particular being able to be understood as mechanical engagement here, may be coupled, i.e. in particular coupled for movement, to the movably mounted linear-drive element to be guided. The at least one additional linear-guide element may therefore likewise be mounted so as to be movable along the movement axis. Specifically, the at least one additional linear-guide element may be designed as a guide block, for example.

The device may comprise a plurality of linear-drive apparatuses arranged or formed in one or more spatial planes. The advantages provided by the linear-drive apparatus with regard to moving and positioning the at least one movably mounted die element and thus also with regard to transferring the die apparatus into the at least one open position and/or into the at least one closed position can be (considerably) enhanced by a plurality of linear-drive apparatuses.

As mentioned, a linear-drive apparatus typically comprises a first and at least one additional linear-drive element. The arrangement of a plurality of linear-drive apparatuses therefore typically requires respective first linear-drive elements, which, as mentioned, are typically the linear-drive elements which are coupled, i.e. in particular coupled for movement, to the relevant movable die element, to be arranged in one or more spatial planes. "Spatial planes" can be understood to be horizontally oriented spatial planes, vertically oriented spatial planes, or spatial planes that are oriented at an angle to a horizontal or vertical spatial plane. Therefore, respective first linear-drive elements may be arranged or formed in one or more horizontal and/or vertical spatial planes, for example.

A plurality of first linear-drive elements arranged in a certain spatial plane are typically arranged in parallel with one another in this case. Typically, respective first linear-drive elements arranged or formed in different spatial planes are also arranged in parallel with one another. Therefore, at least two linear-drive apparatuses may be arranged or formed in parallel in one spatial plane.

According to a specific embodiment, the device may comprise at least two linear-drive apparatuses that are arranged or formed in parallel in a first spatial plane and at least one additional linear-drive apparatus that is arranged or formed in at least one additional spatial plane. The device may therefore comprise a group of at least two linear-drive apparatuses that are arranged or formed in a first spatial plane and at least one additional linear-drive apparatus that is arranged or formed in at least one additional spatial plane.

According to a specific embodiment, the device may comprise at least two linear-drive apparatuses that are arranged or formed in parallel in a first spatial plane and at least two linear-drive apparatuses that are arranged or formed in parallel in an additional spatial plane oriented in parallel with or at an angle to the first spatial plane. The device may therefore comprise a first group of at least two linear-drive apparatuses that are arranged or formed in a first spatial plane and at least one additional group of at least two linear-drive apparatuses that are arranged or formed in at least one additional spatial plane oriented in parallel with or at an angle to the first spatial plane.

Therefore, in particular in a front view of the die apparatus or a view of the main plane of extension of a die element, polygonal arrangements, i.e. in particular triangular, quadrilateral or pentagonal arrangements, of corresponding linear-drive apparatuses, i.e. in particular first linear-drive elements, are possible. The respective quadrilateral arrangements of the first linear-drive elements allow for precise support or mounting of the movably mounted die element that is coupled to the first linear-drive elements.

In this case, the arrangement of the first linear-drive elements is typically selected such that no first linear-drive element extends through a moulding cavity of the die apparatus.

Proceeding from an exemplary rectangular geometry of a main body of a die element (the rectangular geometry of the main body of the relevant die element is typically independent of the geometry of the moulding cavity of the die apparatus), it is e.g. conceivable for at least one first linear-drive element to be arranged in the region of the upper and/or lower and/or lateral edges or in the region of the corners of the rectangular main body in each case. According to a specific embodiment, a first linear-drive element may be arranged in each corner of the rectangular main body of a die element. The relevant first linear-drive element is placed, in particular by a free end, by an end face at the relevant corner of the rectangular main body of the die element.

The device may comprise at least one supporting apparatus, which is configured for supporting at least one first linear-drive element, in particular in an operating position and/or orientation. Supporting a first linear-drive element in a relevant operating position and/or orientation (this is typically understood to be a position and/or orientation of the relevant first linear-drive element in which it allows for a desired movement of a relevant movably mounted die element along the movement axis) improves the precise movement and positioning of the relevant movably mounted die element.

In an embodiment comprising a plurality of first linear-drive elements, the supporting apparatus may be configured for supporting a plurality of first linear-drive elements. The supporting apparatus may comprise at least one, in particular crossbeam-like or crossbeam-shaped, supporting element that interconnects two first linear-drive elements, in particular rigidly, to form a support.

The device may comprise at least one brake apparatus, which is or can be assigned to the linear-drive apparatus, in particular to a movably mounted first linear-drive element, and is configured for generating a brake force that brakes a movement of the linear-drive apparatus, in particular of the movably mounted first linear-drive element, along the movement axis or for generating a blocking force that blocks a movement of the linear-drive apparatus, in particular of the movably mounted first linear-drive element. By means of the brake apparatus, movements of the linear-drive apparatus or the respective movably mounted first linear-drive elements can be braked (to do this, the brake apparatus can generate a brake force that counteracts a movement force acting on a moved linear-drive element and results in deceleration of the movement of the relevant linear-drive element); to do this, the brake apparatus can generate a blocking force that counteracts a movement force acting on a non-moved linear-drive element and results in blocking of movements of the relevant linear-drive element.

The or a brake apparatus may in particular be configured for generating an, in particular equal or greater, blocking force that counteracts a force generated as part of a process for processing particle foam material carried out by means of the device, in particular a process for expanding particle foam material caused by a pressurised process medium, such as steam. By means of the brake apparatus or by means of a brake force that can be generated by means of the brake apparatus, the die apparatus can therefore also be secured in the at least one closed position in the operation of the device. The brake apparatus can therefore compensate for the forces acting on the die elements in the at least one closed position during operation of the device, and accordingly the linear-drive apparatus can therefore be isolated from the forces acting on the die elements in the at least one closed position during operation of the device.

In all the embodiments, the brake apparatus may comprise at least one brake element, which can be moved into a braking position, in which it directly or indirectly acts on a first and/or second linear-drive element by forming a brake force or action, and a non-braking position, in which it does not directly or indirectly act on a first and/or second linear-drive element by forming a brake force or action.

In a specific embodiment, the brake apparatus may comprise at least one brake element, which can be moved into a braking position, in which it is directly or indirectly moved against a rotating linear-drive element, i.e. in particular a second linear-drive element, or against a component connected to a rotating linear-drive element, i.e. in particular a second linear-drive element, by forming a brake force or action, and a non-braking position, in which it is not directly or indirectly moved against a rotating linear-drive element, i.e. in particular a second linear-drive element, or against a component connected to a rotating linear-drive element, i.e. in particular a second linear-drive element, by forming a brake force or action.

In all the embodiments, the at least one brake element can be moved in the movement axis or in parallel with the movement axis of the movably mounted linear-drive element; the at least one brake element can therefore be movably mounted in the movement axis or in parallel with the movement axis of the movably mounted linear-drive element. In principle, however, at least one brake element that is mounted so as to be movable radially relative to the movement axis is also conceivable.

In all the embodiments, the at least one brake element may be designed as a brake pad or may comprise at least one such brake pad.

The device may comprise a control apparatus implemented with hardware and/or software, which is configured for controlling the operation of the drive apparatus for implementing particular movement or speed profiles of the relevant movably mounted die element. The control device may in particular be configured for generating control information controlling the operation of the drive apparatus. The control apparatus may therefore also be configured for controlling movements of a relevant movably mounted linear-drive element. A corresponding movement or speed profile may e.g. define a particular movement of a relevant movably mounted die element, in particular starting from the at least one open position into the at least one closed position of the die apparatus and/or a particular movement of a relevant movably mounted die element, in particular starting from the at least one closed position into the at least one open position of the die apparatus.

The or a control apparatus may further be configured, in particular on the basis of at least one movement or speed profile of a relevant movably mounted die element, for controlling the operation of the brake apparatus, in particular for implementing particular brake-force profiles. The control device may therefore in particular be configured for generating control information controlling the operation of the brake apparatus. The control apparatus may therefore also be configured for controlling movements of a relevant movably mounted brake element.

The device may further comprise at least one detection apparatus implemented with hardware and/or software, which is configured for detecting movements and/or positioning of a movably mounted die element and/or a movably mounted linear-drive element of the linear-drive apparatus. The detection apparatus may comprise at least one, e.g. optically and/or electrically and/or magnetically acting, detection element, which is configured for generating detection information on the basis of movements and/or positioning of a movably mounted die element and/or a movably mounted linear-drive element, i.e. a first and/or second linear-drive element, for example. Corresponding detection information can form a basis for the control of the operation of the drive apparatus and/or the brake apparatus that is or can be carried out by means of the control apparatus. The detection apparatus can therefore communicate, in particular bidirectionally, with the control apparatus, and vice versa.

The device typically comprises additional functional apparatuses, which are required for processing particle foam material for producing a particle foam moulded part. For example, these include a steam-generating apparatus for generating steam fed to the die apparatus and/or a steam storage apparatus for storing steam fed to the die apparatus.

Another aspect of the present specification relates to a method for processing a particle foam material for producing a particle foam moulded part, which method is characterised in that a device according to the first aspect is used for carrying out the method. All the information relating to the device according to the first aspect applies by analogy.

BRIEF DESCRIPTION OF THE DRAWINGS

Embodiments of the present specification are explained again on the basis of embodiments in the drawings, in which.

DETAILED DESCRIPTION

Figure 1:
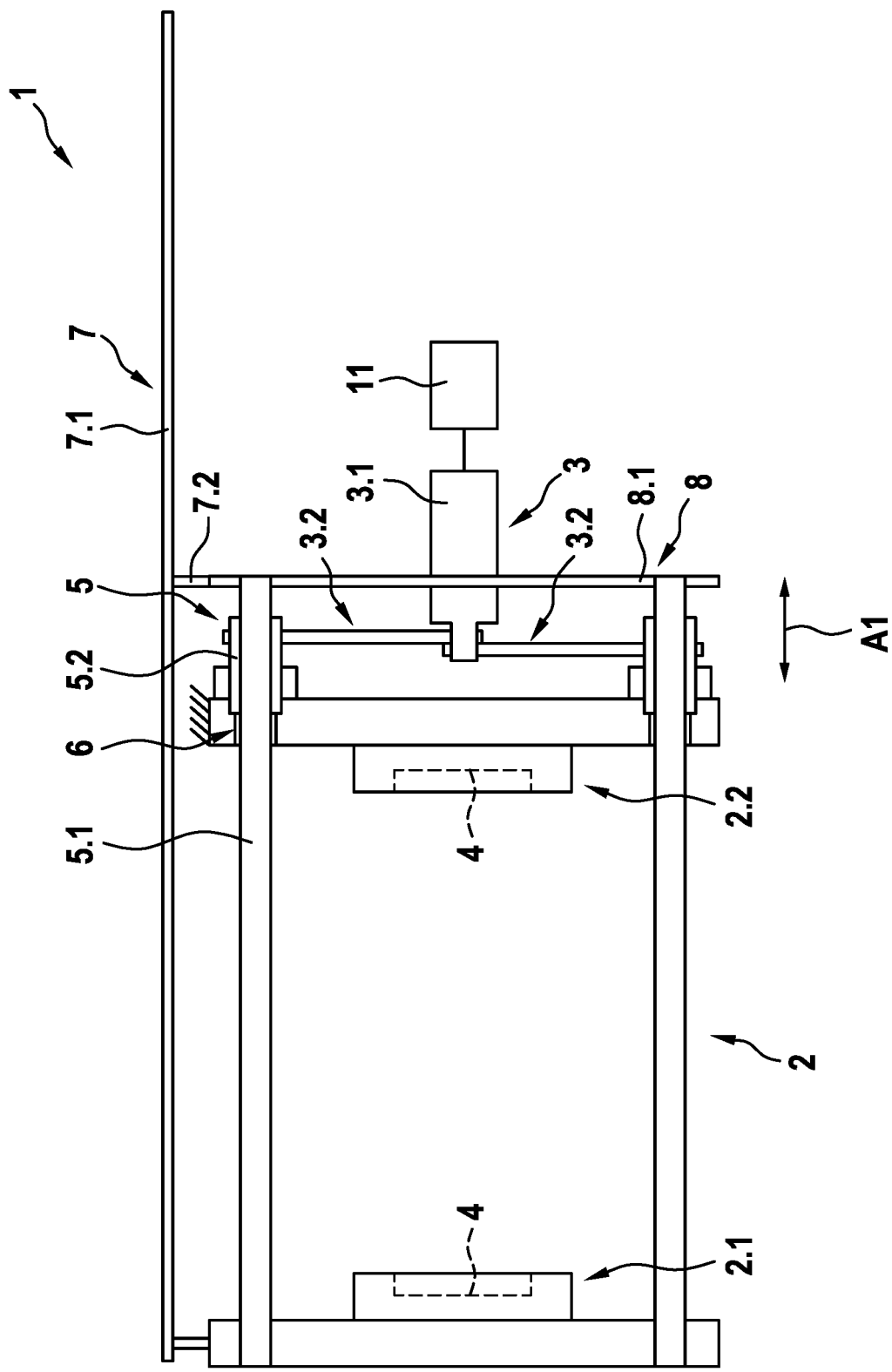
FIG. 1 is a schematic side view of a device for processing a particle foam material for producing a particle foam moulded part according to an embodiment.

FIG. 1 is a schematic diagram of a device 1 for processing a particle foam material for producing a particle foam moulded part according to a first embodiment. The device 1 can also be referred to as or considered to be a moulding machine.

The device 1 is therefore designed for carrying out at least one working process for processing a particle foam material for producing a particle foam moulded part. As is clear from the following, an expansion or connection process of a particle foam material for producing a particle foam moulded part can be considered to be an example of a corresponding working process.

A particle foam material that can be or is to be processed by means of the device 1 is typically an expandable or expanded plastics particle material. The particle foam material may e.g. be formed by expandable or expanded plastics particles or may comprise expandable or expanded plastics particles. In this context, purely by way of example, reference is made to expanded and/or expandable polypropylene (PP or EPP), expanded and/or expandable polystyrene (PS or EPS) and expanded and/or expandable thermoplastic elastomer (TPE). Mixtures of expandable or expanded particle materials or particles that differ in at least one chemical and/or physical parameter are conceivable; the term "particle foam material" can therefore also cover mixtures of expandable or expanded particle materials or particles that differ in at least one chemical and/or physical parameter.

The device 1 comprises a die apparatus 2 and a drive apparatus 3 that is or can be assigned to the die apparatus 2. Although it is not shown in the embodiments shown in the drawings, the device 1 may comprise a plurality of die apparatuses 2 and a plurality of drive apparatuses 3.

Figure 2:
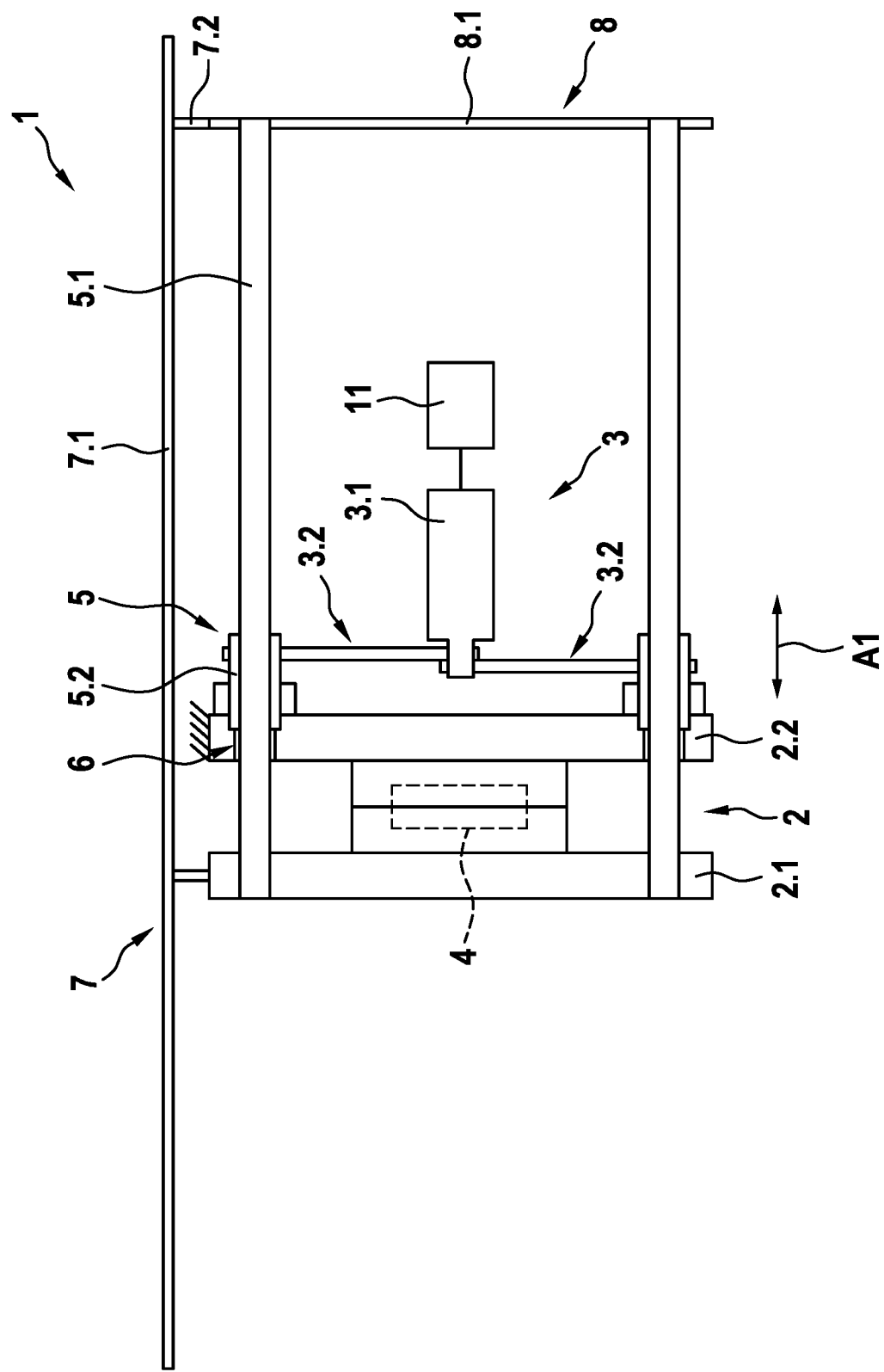
FIG. 2 is a schematic side view of a device for processing a particle foam material for producing a particle foam moulded part according to an embodiment.
Figure 3:
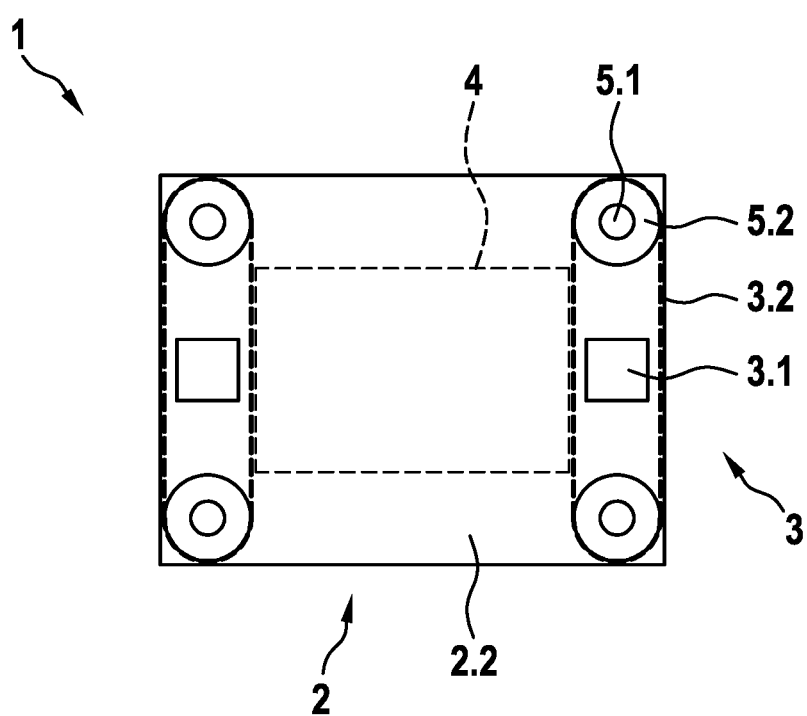
FIG. 3 is a schematic rear view, rotated by 90° compared with the views according to FIGS. 1 and 2, of a device for processing a particle foam material for producing a particle foam moulded part according to another embodiment.

In each of the exemplary configurations of the embodiments shown in FIG. 1-3, the die apparatus 2 comprises a first die element 2.1 and an additional or second die element 2.2 in each case. The first die element 2.1 is mounted so as to be movable relative to the additional die element 2.2 along a movement axis A1 defining a movement path and shown by the double-headed arrow P1, which axis is a linear or translational axis. Alternatively or additionally, the additional die element 2.2 could be mounted so as to be movable relative to the first die element 2.1 along the movement axis A1. The die apparatus 2 therefore comprises a plurality of die elements 2.1, 2.2, wherein at least one die element 2.1 is mounted so as to be movable relative to an additional die element 2.2 along a movement axis A1.

The movably mounted die element 2.1 is mounted so as to be movable between a first position shown in FIG. 1 and an additional or second position shown in FIG. 2. The first position may, as shown in FIG. 1, be correlated with an open position of the die apparatus 2, and the second position may, as shown in FIG. 2, be correlated with a closed position of the die apparatus 2. In the open position of the die apparatus 2, it is possible to access a moulding cavity 4, shown in FIG. 2, of the die apparatus 2. In the closed position, it is not possible to access the moulding cavity 4 of the die apparatus 2. By moving the movably mounted die element 2.1 relative to the additional die element 2.2, an open position and a closed position of the die apparatus 2 can therefore be produced. The die apparatus 2 can therefore be transferred into an open position and a closed position by moving the movably mounted die element 2.1.

It is conceivable that the movably mounted die element 2.1 and therefore also the die apparatus 2 can be moved into a plurality of open positions, which differ in their respective degrees of opening, and/or into a plurality of closed positions, which differ in their respective degrees of closing.

If the movably mounted die element 2.1 can be moved into a plurality of closed positions, it is applicable that a first closed position brings about a first degree of closure of the die apparatus 2 and a second closed position brings about a second degree of closure of the die apparatus 2 that is different from, i.e. in particular greater than, the first degree of closure. The movement of the movably mounted die element 2.1 from the first closed position into the second closed position may be an embossing stroke movement, or an embossing stroke for short. In the second closed position, an embossing force can therefore be exerted on a particle foam material positioned in the moulding cavity 4. By moving the movably mounted die element 2.1 from the first closed position into the second closed position, an embossing process can therefore be implemented in which an embossing force can be exerted on a particle foam material positioned in the moulding cavity 4. The second closed position can therefore be referred to as or considered to be an embossing position.

In the exemplary configurations of the embodiments shown in FIG. 1-3, the die apparatus 2 comprises the movably mounted die element 2.1 and the non-movably mounted additional die element 2.2. The movably mounted die element 2.1 is mounted so as to be movable relative to the additional die element 2.2 between the first position shown in FIG. 1 and the second position shown in FIG. 2. It is clear that the first position is correlated with the open position of the die apparatus 2 and the second position is correlated with the closed position of the die apparatus 2.

The following information applies by analogy to devices 1 comprising differently configured die apparatuses 2.

In the exemplary configurations of the embodiments shown in FIG. 1-3, a die element 2.1, 2.2 is designed as a die carrier element, which is designed to carry a die part delimiting the moulding cavity 4 of the die apparatus 2. Alternatively or additionally, a die element 2.1, 2.2 could be designed as a die part delimiting the moulding cavity 4 of the die apparatus 2, in particular a die half delimiting the moulding cavity 4 of the die apparatus 2.

The drive apparatus 3 is configured for generating and/or transmitting a drive force that sets the movable die element 2.1 into a movement along the movement axis A1. As is clear from the following, the drive apparatus 3 may comprise a plurality of interacting parts for generating and/or transmitting a drive force that sets the movably mounted die element 2.1 into a movement along the movement axis A1.

The drive apparatus 3 may comprise at least one drive unit 3.1 for generating the drive force and at least one force-transmission unit 3.2 for transmitting a drive force to the movably mounted die element 2.1. The drive unit 3.1 may e.g. be designed as a drive motor, in particular an electric drive motor. The force-transmission unit 3.2 may e.g. be designed as a force-transmission means, in particular force-transmission belts, chains, etc.

In the exemplary configuration of the embodiment shown in FIGS. 1 and 2, it can be seen that the drive apparatus 3 comprises two force-transmission units 3.2. The drive unit 3.1 is therefore coupled to two force-transmission units 3.2, by means of which a drive force can be transmitted to the movably mounted die element 2.1.

In all the embodiments, the term "drive force" used herein also covers a "drive torque"; the term "drive force" can therefore be equated with a "drive torque".

In the exemplary configurations of the embodiments shown in FIG. 1-3, the drive apparatus 3 comprises a plurality of linear-drive apparatuses 5. The movement axis A1 along which the movably mounted die element 2.1 can be moved is therefore the above-mentioned linear or translational axis. Movements of the movably mounted die element 2.1 along the movement axis A1 are therefore linear or translational movements.

In the exemplary configurations of the embodiments shown in FIG. 1-3, a relevant linear-drive apparatus 5 comprises a first linear-drive element 5.1 and a second linear-drive element 5.2 interacting therewith, in particular by means of mechanical engagement, which, as is clear from the following, is in particular threaded engagement here. The relevant first linear-drive element 5.1 is mounted so as to be movable along the movement axis A1. The relevant second linear-drive element 5.2 is mounted so as not to be movable along the movement axis A1. The relevant second linear-drive element 5.2 is configured for transmitting a drive force that sets the relevant first linear-drive element 5.1 into a movement along the movement axis A1 to the relevant first linear-drive element 5.1.

In the exemplary configurations of the embodiments shown in FIG. 1-3, the relevant first linear-drive element 5.1 is designed as a first threaded element, i.e. as a threaded spindle. In the exemplary configurations of the embodiments shown in FIG. 1-3, in each case, the relevant second linear-drive element 5.2 is designed as a second threaded element that is in mechanical engagement with the first threaded element, i.e. in particular as a nut that is in mechanical engagement (threaded engagement) with the threaded spindle. In the exemplary configurations of the embodiments shown in FIG. 1-3, a relevant linear-drive apparatus 5 is therefore designed as a threaded mechanism or screw mechanism comprising a threaded spindle and a nut.

In the exemplary configurations of the embodiments shown in FIG. 1-3, the respective threaded spindles are mounted translationally along the movement axis A1, but are not rotatably mounted. In the exemplary configurations of the embodiments shown in FIG. 1-3, the respective nuts are mounted so as to be rotatable about a rotational axis, i.e. in particular about the movement axis A1 or an axis of symmetry or a central axis of the nuts, but are not translationally movably mounted. In the exemplary configurations of the embodiments shown in FIG. 1-3, a relevant linear-drive apparatus 5 designed as a threaded mechanism or screw mechanism is therefore configured to have a translationally movable but not rotationally movable threaded spindle and a rotationally movable but not translationally movable nut.

In the exemplary configurations of the embodiments shown in FIG. 1-3, the drive apparatus 3 comprises a linear-drive apparatus. In the exemplary configurations of the embodiments shown in FIG. 1-3, the drive unit 3.1 associated with the drive apparatus 3 accordingly constitutes a linear-drive unit that is or can be assigned to a relevant first linear-drive element 5.1 or second linear-drive element 5.2. A relevant second linear-drive unit is accordingly configured for generating a drive force that sets the relevant first linear-drive element 5.1 into a movement along the movement axis A1. A relevant linear-drive unit may therefore specifically be designed as a linear-drive motor, in particular an electric linear-drive motor, or may comprise at least one such motor.

On the basis of the exemplary configurations of the embodiments shown in FIG. 1-3, it can be seen that a linear-drive unit is or can be assigned to a plurality of linear-drive apparatuses 5. A linear-drive unit may therefore be configured for generating a drive force that sets a first linear-drive element 5.1 of a first linear-drive apparatus 5 (cf. e.g. the upper linear-drive apparatus 5 in FIGS. 1 and 2) into a movement along the movement axis A1 and for generating a drive force that sets an additional first linear-drive element 5.1 of an additional linear-drive apparatus 5 (cf. e.g. the lower linear-drive apparatus 5 in FIGS. 1 and 2) into a movement along the movement axis A1. In this way, a synchronous movement of a plurality of first linear-drive elements 5.1 along the movement axis 5 can be produced and/or ensured.

In the exemplary configurations of the embodiment shown in FIGS. 1 and 2, the linear-drive unit is configured for generating a drive force that sets the respective nuts in a rotational movement. The nuts set into a rotational movement set the respective threaded spindles, which are in mechanical engagement therewith, into a translational movement along the movement axis A1.

In the exemplary configurations of the embodiments shown in FIG. 1-3, the respective first linear-drive elements 5.1, i.e. the threaded spindles, are coupled, in particular coupled for movement, to the movably mounted die element 2.1. Movements of the respective first linear-drive elements 5.1 therefore correlate with movements of the movably mounted die element 2.1 owing to the coupling or movement coupling to the movably mounted die element 2.1.

The coupling or movement coupling between the respective first linear-drive elements 5.1 and the movably mounted die element 2.1 may be produced by the respective first linear-drive elements 5.1 being directly or indirectly fastened to the movably mounted die element 2.1; the respective first linear-drive elements 5.1 may therefore be directly or indirectly fastened to the movably mounted die element 2.1. The respective first linear-drive elements 5.1 can be fastened to the movably mounted die element 2.1 by means of form-fitting and/or force-locked and/or material-bonded types of fastening, i.e. by means of clamped fastenings, tensioned fastenings, screwed fastenings or welded fastenings, for example. The respective first linear-drive elements 5.1 can be fastened to the movably mounted die element 2.1 so as to be detachable (without being damaged or destroyed).

In the exemplary configurations of the embodiments shown in FIG. 1-3, the non-movably die element 2.2 comprises a plurality of, in particular bore-like or bore-shaped, or slot-like or slot-shaped, openings 6, which are or can each be penetrated by a first linear-drive element 5.1. The openings 6 are dimensioned such that there is a certain distance between the walls of the die element 2.2 delimiting said opening and a relevant first linear-drive element 5.1 penetrating said opening, such that the first linear-drive element 5.1 penetrating the relevant opening 6 does not come into contact with the walls of the die element 2.2 delimiting the opening 6. In other words, the openings 6 have a certain oversize compared with a first linear-drive element 5.1 penetrating one of said openings, such that the first linear-drive element 5.1 penetrating the respective openings 6 are mounted so as to be movable relative to the die element 2.2 comprising the openings 6. The openings 6 can therefore be referred to as or considered to be through-openings for corresponding first linear-drive elements 5.1.

In the exemplary configurations of the embodiments shown in FIG. 1-3, it can be seen that the device 1 may comprise guide apparatuses 7, which are or can be assigned to the linear-drive apparatuses 6 and are configured for guiding, along the movement axis A1, a first linear-drive element 5.1, which is mounted so as to be movable along the movement axis A1, during a movement along the movement axis A1. Movements of the relevant movably mounted first linear-drive element 5.1 may therefore be guided movements. In this way, precise movement and positioning of the mounted die element 2.1 into respective first and second positions or between respective first and second positions can be ensured. Since, in the exemplary configurations of the embodiments shown in FIG. 1-3, the second position is correlated with the closed position of the die apparatus 2, precise positioning of the die element 2.1, 2.2 in the closed position of the die apparatus 2 can therefore also be ensured.

On the basis of the exemplary configurations of the embodiments shown in FIG. 1-3, it can also be seen that a corresponding guide apparatus 7 may be designed as a linear guide. A corresponding linear guide may comprise a first linear-guide element 7.1 and an additional linear-guide element 7.2. The first linear-guide element 7.1 interacts with the additional linear-guide element 7.2 to form a linear guide of the movably mounted linear-drive element 5.1 along the movement axis A1. The first linear-guide element 7.1 may define a guide axis that coincides with the movement axis A1 or is arranged or oriented in parallel therewith.

On the basis of FIG. 1-3, it can be seen that the first linear-guide element 7.1 may specifically be designed as a guide rail or guide rod, for example. An additional linear-guide element 7.2 interacting with the first linear-guide element 7.1, this in particular being able to be understood as mechanical engagement here, may be coupled, i.e. in particular coupled for movement, to the movably mounted first linear-drive element 5.1 to be guided. The additional linear-guide element 7.2 may therefore likewise be mounted so as to be movable along the movement axis A1. Specifically, a relevant additional linear-guide element 7.2 may be designed as a guide block, for example.

On the basis of the exemplary configuration of the embodiment shown in FIGS. 1 and 2, it can be seen that the device 1 may comprise a supporting apparatus 8, which is configured for supporting at least one first linear-drive element 5.1, in particular in an operating position and/or orientation.

With reference to FIGS. 1 and 2, it is clear that the supporting apparatus 8 may be configured for supporting a plurality of first linear-drive elements 5.1. For this purpose, the supporting apparatus 8 may comprise at least one, in particular crossbeam-like or crossbeam-shaped, supporting element 8.1 that interconnects two first linear-drive elements 5.1, in particular rigidly, to form a support.

On the basis of the exemplary configuration of the embodiment shown in FIGS. 1 and 2, it can also be seen that the device 1 may comprise a plurality of linear-drive apparatuses 5 arranged or formed in a plurality of spatial planes. As shown by way of example in FIGS. 1 and 2, spatial planes may be understood to be horizontally oriented spatial planes. In principle, arrangements in a plurality of vertically oriented spatial planes or in spatial planes that are oriented at an angle to a horizontal or vertical spatial plane are also conceivable.

On the basis of the exemplary configuration of the embodiment shown in FIG. 3, it can be seen that the device 1 may comprise two linear-drive apparatuses 5 that are arranged or formed in parallel in a first spatial plane and two linear-drive apparatuses 5 that are arranged or formed in parallel in an additional spatial plane oriented in parallel with the first spatial plane. The device 1 may therefore comprise a first group of two linear-drive apparatuses 5 that are arranged or formed in a first spatial plane (upper or left-hand spatial plane) and an additional group of two linear-drive apparatuses 5 that are arranged or formed in an additional spatial plane (lower or right-hand spatial plane) oriented in parallel with the first spatial plane.

On the basis of the exemplary configuration of the embodiment shown in FIG. 3, it can also be seen that, in a front view of the die apparatus 3 or a view, shown in FIG. 3, of the main plane of extension of the die element 2.2, polygonal arrangements, i.e. quadrilateral arrangements here, by way of example, of corresponding linear-drive apparatuses 5 or first linear-drive elements 5.1 are possible.

In this case, it can be seen that the arrangement of the first linear-drive elements 5.1 is selected such that no first linear-drive element 5.1 extends through the moulding cavity 4 of the die apparatus 2.

Specifically, the exemplary configuration of the embodiment shown in FIG. 3 shows that, proceeding from the exemplary rectangular geometry of a main body (not provided with any further reference signs) of the die element 2.2, it is conceivable for at least one first linear-drive element 5.1 to be arranged in the region of the upper and/or lower and/or lateral edges or in the region of the corners of the rectangular main body of the die element 2.2 in each case. According to the exemplary configuration of the embodiment shown in FIG. 3, a first linear-drive element 5.1 is arranged in each corner of the rectangular main body of the die element 2.2. The respective first linear-drive elements 5.1 can be placed, in particular by a free end, by an end face at the relevant corner of the rectangular main body of the die element 2.2.

On the basis of the exemplary configurations of the embodiments shown in FIG. 1-3, it can generally be seen that a plurality of first linear-drive elements 5.1 arranged in a particular spatial plane can be arranged in parallel with one another and that respective first linear-drive elements 5.1 arranged or formed in different spatial planes can be arranged in parallel with one another.

It is applicable to all the embodiments that the device 1 may comprise at least one brake apparatus 9, which is or can be assigned to the linear-drive apparatus 5 and is configured for generating a brake force that brakes a movement of the movably mounted first linear-drive element(s) 5.1 along the movement axis A1 or for generating a blocking force that blocks a movement of the movably mounted first linear-drive elements 5.1. By means of the brake apparatus 9, movements of first or second linear-drive elements 5.1, 5.2 can be braked (to do this, the brake apparatus 9 can generate a brake force that counteracts a movement force acting on a moved first or second linear-drive element 5.1, 5.2 and results in deceleration of the movement of the relevant first or second linear-drive element 5.1, 5.2) or can be completely blocked (to do this, the brake apparatus 9 can generate a blocking force that counteracts a movement force acting on a non-moved first or second linear-drive element 5.1, 5.2 and results in blocking of movements of the relevant first or second linear-drive element 5.1, 5.2).

A corresponding brake apparatus 9 may in particular be configured for generating an, in particular equal or greater, blocking force that counteracts a force generated as part of a process for processing particle foam material carried out by means of the device 1, in particular a process for expanding particle foam material caused by a pressurised process medium, such as steam. By means of a corresponding brake apparatus 9 or by means of a brake force that can be generated by means of the corresponding brake apparatus 9, the die apparatus 2 can therefore also be secured in the closed position in the operation of the device 1. The corresponding brake apparatus 9 can therefore compensate for the forces acting on the die elements 2.1, 2.2 in the closed position during operation of the device 1, and accordingly the linear-drive apparatuses 5 can therefore be isolated from the forces acting on the die elements 2.1, 2.2 in the closed position during operation of the device 1.

On the basis of the exemplary configuration of the embodiment shown in FIGS. 1 and 2, it can be seen that a separate brake apparatus 9 may be assigned to each linear-drive apparatus.

Figure 4:
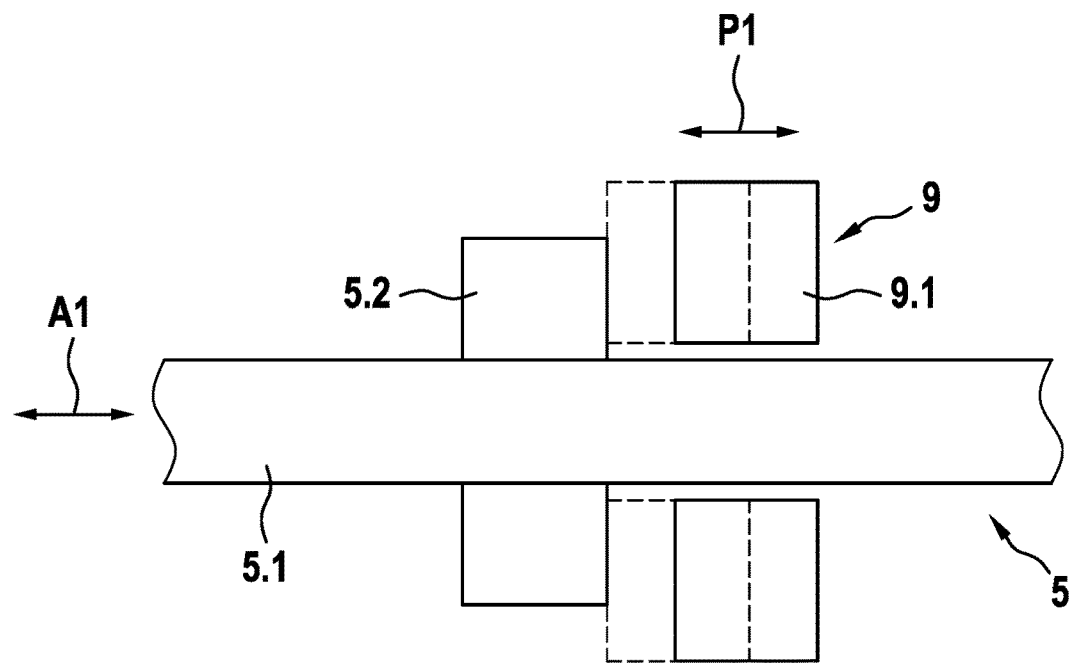
FIG. 4 is a schematic side view of a brake apparatus of a device for processing a particle foam material for producing a particle foam moulded part according to an embodiment.

FIG. 4 is a schematic side view of a brake apparatus 9 of a device 1 for processing a particle foam material for producing a particle foam moulded part according to an embodiment.

In the exemplary configuration of the embodiment shown in FIG. 4, the brake apparatus 9 comprises a brake element 9.1, which can be moved into a braking position, shown by dashed lines in FIG. 4, in which it directly acts on a second linear-drive element 5.2 by forming a brake force or action, and a non-braking position, in which it does not directly act on the second linear-drive element 5.2 by forming a brake force or action. The brake element 9.1 may e.g. be a brake pad or the brake element 9.1 may comprise at least one such brake pad.

Figure 5:
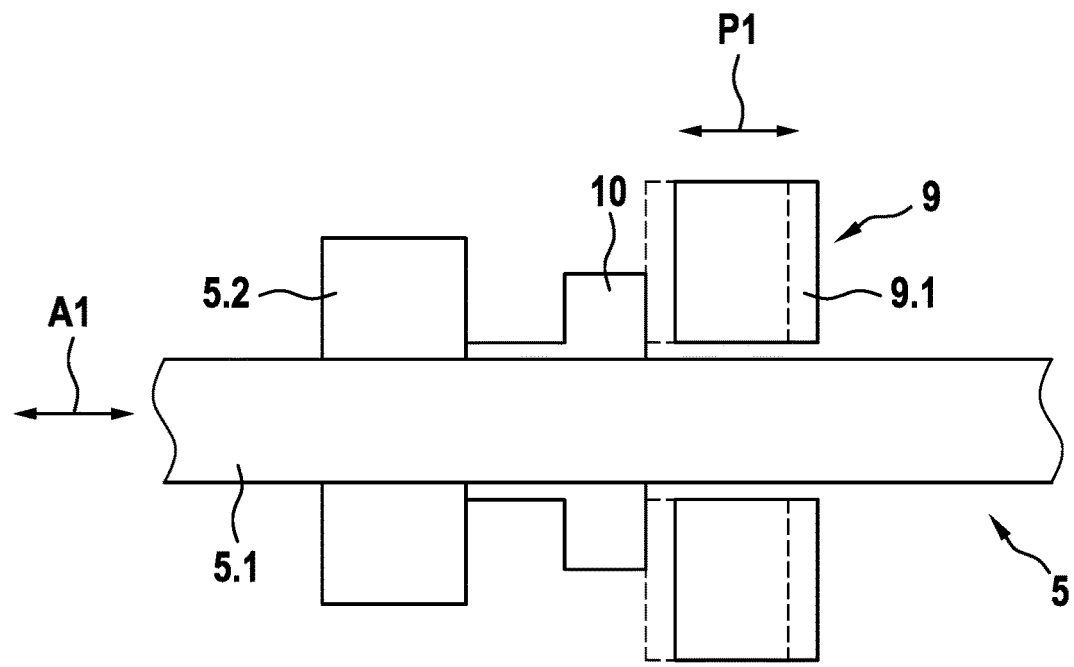
FIG. 5 is a schematic side view of a brake apparatus of a device for processing a particle foam material for producing a particle foam moulded part according to an embodiment.

FIG. 5 is a schematic side view of a brake apparatus 9 of a device 1 for processing a particle foam material for producing a particle foam moulded part according to another embodiment.

In the exemplary configuration of the embodiment shown in FIG. 5, the brake apparatus 9 comprises a brake element 9.1, which can be moved into a braking position, shown by dashed lines in FIG. 5, in which it indirectly acts on a second linear-drive element 5.2 by forming a brake force or action, and a non-braking position, in which it does not indirectly act on the second linear-drive element 5.2 by forming a brake force or action. The brake element 9.1 may again e.g. be a brake pad or the brake element 9.1 may comprise at least one such brake pad.

In the exemplary configuration of the embodiment shown in FIG. 5, the brake apparatus 9 comprises a brake element 9.1, which can be moved into a braking position, in which it is moved against a component 10 connected to a rotating linear-drive element, i.e. in particular a second linear-drive element 5.2, by forming a brake force or action, and a non-braking position, in which it is not moved against the component 10 connected to the second linear-drive element 5.2 by forming a brake force or action.

On the basis of FIGS. 4 and 5, it can be seen that, in all the embodiments, the at least one brake element 9.1 can be moved in the movement axis A1 or in parallel with the movement axis; the at least one brake element 9.1 can therefore be movably mounted in the movement axis A1 or in parallel with the movement axis. In principle, however, brake elements 9.1 that are mounted so as to be movable radially relative to the movement axis A1 are also conceivable.

Even though it is not shown in the drawings, alternatively or additionally, a brake element 9.1 may also directly or indirectly act on the first linear-drive element 5.1. A brake element 9.1 could therefore, for example, directly act on a first linear-drive element 5.1, such that the brake force or action generated by the brake element brakes or blocks a movement of the first linear-drive element 5.1 along the movement axis A1.

In all the embodiments, the device 1 may comprise a control apparatus 11 implemented with hardware and/or software, which is configured for controlling the operation of the drive apparatus 3 for implementing particular movement or speed profiles of the movably mounted die element 2.1. The control device 11 may in particular be configured for generating control information controlling the operation of the drive apparatus 3. The control apparatus 11 may therefore also be configured for controlling movements of the movably mounted first linear-drive elements 5.1. A corresponding movement or speed profile may e.g. define a particular movement of the movably mounted die element 2.1, in particular starting from the open position into the closed position of the die apparatus 2, and/or a particular movement of the movably mounted die element 2.1, in particular starting from the closed position into the open position of the die apparatus 2.

The control apparatus 11 may, in particular on the basis of at least one movement or speed profile of the movably mounted die element 2.1, also be configured for controlling the operation of the brake apparatus 9, in particular for implementing particular brake-force profiles. The control device 11 may therefore in particular be configured for generating control information controlling the operation of the brake apparatus 9. The control apparatus 11 may therefore also be configured for controlling movements of a relevant movably mounted brake element 9.1.

Even though it is not shown in the drawings, the device 1 may further comprise at least one detection apparatus implemented with hardware and/or software, which is configured for detecting movements and/or positioning of the movably mounted die element 2.1 and/or a movably mounted first linear-drive element 5.1. The detection apparatus may comprise at least one, e.g. optically and/or electrically and/or magnetically acting, detection element, which is configured for generating detection information on the basis of movements and/or positioning of the movably mounted die element 2.1 and/or a movably mounted first linear-drive element 5.1. Corresponding detection information can form a basis for the control of the operation of the drive apparatus 3 and/or the brake apparatus 9 that is or can be carried out by means of the control apparatus 11. The detection apparatus can therefore communicate, in particular bidirectionally, with the control apparatus 11, and vice versa.

Even though it is not shown in the drawings, in all the embodiments, the device 1 typically comprises additional functional apparatuses, which are required for processing particle foam material for producing a particle foam moulded part. For example, these include a steam-generating apparatus for generating steam fed to the die apparatus and/or a steam storage apparatus for storing steam fed to the die apparatus.

Using the devices 1 shown in the embodiments shown in drawings, a method for processing a particle foam material for producing a particle foam moulded part can be implemented.

Individual aspects and/or features, multiple aspects and/or features or all the aspects and/or features described in connection with a particular embodiment are transferable to individual aspects and/or features, multiple aspects and/or features or all the aspects and/or features described in connection with at least one other embodiment. The embodiments according to the drawings can therefore be combined with one another.

The invention claimed is:

1. A device for processing a particle foam material for producing a particle foam molded part, comprising:
    at least one mold apparatus, comprising a moveable first mold element and at least one non-moveable additional mold element, wherein the first mold element is movable along a movement axis relative to the at least one non-moveable additional mold element;
    at least one drive apparatus which is or can be assigned to the at least one mold apparatus and is configured for generating and/or transmitting a drive force that sets the moveable first mold element into motion along the movement axis, wherein the at least one drive apparatus is designed as or comprises a linear-drive apparatus, wherein the linear-drive apparatus comprises at least one first linear-drive element and at least one second linear-drive element interacting therewith by means of mechanical engagement, wherein the first linear-drive element is mounted so as to be movable along the movement axis and the second linear-drive element is configured for generating and/or transmitting a drive force that sets the first linear-drive element into motion along the movement axis;

a linear-guide apparatus comprising a first linear-guide element that defines a guide axis that coincides with the movement axis or is arranged or oriented in parallel therewith and at least one additional linear-guide element, wherein the additional linear-guide element is transverse to and is cantilevered from the linear guide element such that the additional linear guide element extends in a transverse direction relative to the guide axis, wherein the first linear-guide element interacts with the at least one additional linear-guide element to guide the at least one first linear-drive element of the linear-drive apparatus along the movement axis, wherein the first linear-guide element is a guide rail or a guide rod and the at least one additional linear-guide element is coupled to an exposed portion of the at least one first linear-drive element of the linear-drive apparatus; and at least one supporting apparatus, the at least one supporting apparatus supporting a portion of the at least one first linear-drive element in an operating position, wherein:

the at least one non-moveable additional mold element comprises at least one through-opening, and a portion of the at least one first linear-drive element comprising the portion supported by the at least one supporting apparatus penetrates through the at least one through-opening in the at least one non-moveable additional mold element.

2. The device according to claim 1, wherein the linear-drive apparatus comprises a linear-drive unit that is or can be assigned to the at least one first linear-drive element and/or the at least one second linear-drive element and is configured for generating a drive force that sets the at least one first linear-drive element into motion along the movement axis.

3. The device according to claim 1, wherein the at least one first linear-drive element is coupled to the moveable first mold element and/or the at least one non-moveable additional mold element.

4. The device according to claim 1, wherein the at least one first linear-drive element is designed as or comprises a threaded spindle and the at least one second linear-drive element is designed as or comprises a nut that engages with the threaded spindle.

5. The device according to claim 1, comprising a plurality of linear-drive apparatuses arranged or formed in one or more spatial planes.

6. The device according to claim 5, wherein at least two linear-drive apparatuses are arranged or formed in parallel in one spatial plane.

7. The device according to claim 6, comprising at least two linear-drive apparatuses that are arranged or formed in parallel in a first spatial plane and at least one additional linear-drive apparatus that is arranged or formed in at least one additional spatial plane, or at least two linear-drive apparatuses that are arranged or formed in parallel in a first spatial plane and at least two linear-drive apparatuses that are arranged or formed in parallel in an additional spatial plane oriented in parallel with or at an angle to the first spatial plane.

8. The device according to claim 1, wherein the at least one supporting apparatus comprises at least one supporting element that interconnects two first linear-drive elements to form a support.

9. The device according to claim 1, comprising a brake apparatus, which is or can be assigned to the at least one drive apparatus and is configured for generating a brake force that brakes motion of the at least one linear-drive element of the linear-drive apparatus along the movement axis or for generating a blocking force that blocks motion of the at least one linear-drive element of the linear-drive-apparatus.

10. The device according to claim 9, wherein the brake apparatus is configured for generating an blocking force that counteracts a force generated as part of a process for processing particle foam material carried out by means of the device.

11. The device according to claim 9, comprising at least one control apparatus, which, on a basis of at least one movement profile of at least one movably mounted mold element, is configured for controlling an operation of the brake apparatus for implementing particular brake-force profiles.

12. The device according to claim 1, comprising a control apparatus, which is configured for controlling an operation of the at least one drive apparatus for implementing particular movement profiles of at least one movably mounted mold element.

13. The device according to claim 1, wherein the first moveable mold element is designed as a mold part delimiting a moulding cavity of the at least one mold apparatus, or as a mold carrier element, which is designed to carry a mold part delimiting a moulding cavity of the at least one mold apparatus.

14. The device according to claim 1, comprising a detection apparatus configured for detecting movements and/or positioning of at least one movably mounted mold element and/or the linear-drive apparatus of the at least one drive apparatus.

15. A method for processing a particle foam material for producing a particle foam molded part, wherein a device according to claim 1 is used for carrying out the method.

* * * * *